US012588099B2

(12) United States Patent　　　　　(10) Patent No.:　US 12,588,099 B2

Matsumura et al.　　　　　　　　　　(45) Date of Patent:　　Mar. 24, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 307 days.

(21) Appl. No.: 18/264,635

(22) PCT Filed: Feb. 18, 2021

(86) PCT No.: PCT/JP2021/006054

§ 371 (c)(1),
(2) Date: Aug. 8, 2023

(87) PCT Pub. No.: WO2022/176091

PCT Pub. Date: Aug. 25, 2022

(65) Prior Publication Data

US 2024/0107619 A1　　　Mar. 28, 2024

(51) Int. Cl.
*H04W 76/27*　　　　　(2018.01)

(52) U.S. Cl.
CPC ................................... *H04W 76/27* (2018.02)

(58) Field of Classification Search
CPC ..... H04W 76/27; H04W 16/28; H04W 36/08; H04W 8/22; H04W 8/26; H04W 36/085; H04W 36/083; H04W 36/087; H04W 36/13
See application file for complete search history.

(56) References Cited

U.S. PATENT DOCUMENTS

2020/0120644 A1*　4/2020　Zhou .................... H04B 7/0617
2024/0007169 A1*　1/2024　Da Silva ............... H04B 7/088

OTHER PUBLICATIONS

63124555, Specification,Dec. 11, 2020 (Year: 2020).*
63124555, Drawings-only_black_and_white_line_drawings,Dec. 11, 2020 (Year: 2020).*
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)"; Mar. 2010 (149 pages).
International Search Report issued in PCT/JP2021/006054 on Aug. 3, 2021 (3 pages).
Written Opinion of the International Searching Authority issued in PCT/JP2021/006054 on Aug. 3, 2021 (3 pages).

* cited by examiner

*Primary Examiner* — Ji-Hae Yea

(74) *Attorney, Agent, or Firm* — Osha Bergman Watanabe & Burton LLP

(57)　　　　　　　　ABSTRACT

A terminal according to one aspect of the present disclosure includes: a transmitting section that transmits capability information indicating support of update of at least part of radio resource control (RRC) parameters between a serving cell and a non-serving cell; and a control section that assumes, when the capability information is transmitted, different cell radio network identifiers (C-RNTIs) in the serving cell and the non-serving cell. According to one aspect of the present disclosure, a C-RNTI can be appropriately selected.

7 Claims, 20 Drawing Sheets

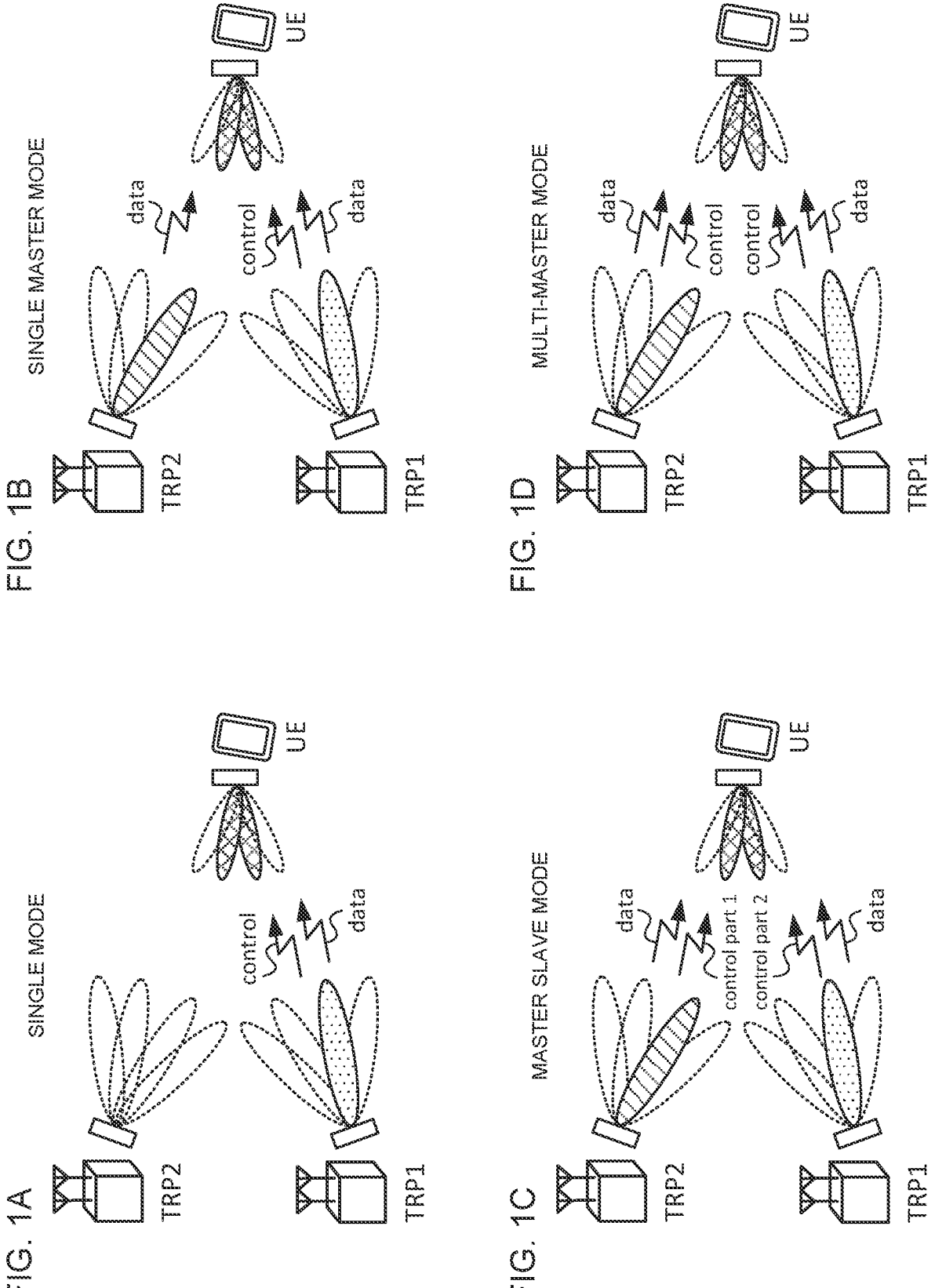

CORESET#1
- TCI state#1
- Non Serbing cell#1(PCI#6)

FIG. 8

| Unified-TCI codepoint | Unified TCI state | Serving cell (PCI) |
|---|---|---|
| 000 | TCI state#1 | Serving cell (PCI#20) |
| 001 | TCI state#5 | Non serving cell#1 (PCI#6) |
| ... | ... | ... |
| 111 | TCI state#52 | Non serving cell #2(PCI#250) |

FIG. 9

| TCI codepoint | TCI state | Serving cell (PCI) |
|---|---|---|
| 000 | TCI state#1 | Serving cell (PCI#20) |
| 001 | TCI state#5 | Non serving cell#1 (PCI#6) |
| ... | ... | ... |
| 111 | TCI state#52 | Non serving cell #2(PCI#250) |

FIG. 10

| SRI field | SRI | Serving cell (PCI) |
|---|---|---|
| 0 | SRS resource#1 (CSI-RS#1) | Serving cell (PCI#20) |
| 1 | SRS resource#2 (CSI-RS#2) | Non serving cell#1 (PCI#6) |

FIG. 11

| Non serving cell index (PCI) | C-RNTI |
|---|---|
| Non serving cell#1 (PCI#245) | C-RNTI#1 |
| Non serving cell#2 (PCI#562) | C-RNTI#2 |
| Non serving cell#3 (PCI#277) | C-RNTI#3 |

FIG. 12

| RRC configured non serving index (flag) | Actual non serving cell |
|---|---|
| Non serving cell#1 | Non serving cell#10, PCI#10, C-RNTI#10 |
| Non serving cell#2 | Non serving cell#6, PCI#6, C-RNTI#6 |
| Non serving cell#3 | Non serving cell#2, PCI#2, C-RNTI#2 |

FIG. 13

| Re-indexing ID of a non-serving cell | PCI value |
|---|---|
| ID#1 | PCI#10 |
| ID#2 | PCI#6 |
| ID#3 | PCI#2 |

FIG. 14

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+(plus)," "6th generation mobile communication system (6G)," "New Radio (NR)," "3GPP Rel. 15 (or later versions)," and so on) are also under study.

In existing LTE systems (for example, 3GPP Rel. 8 to Rel. 14), a user terminal (User Equipment (UE)) transmits uplink control information (UCI) by using at least one of a UL data channel (for example, a Physical Uplink Shared Channel (PUSCH)) and a UL control channel (for example, a Physical Uplink Control Channel (PUCCH)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), layer 1/layer 2 (L1/L2) inter-cell mobility that facilitates more efficient DL/UL beam management (that achieves lower latency and overhead) is studied.

In L1/L2 inter-cell mobility, serving cell change is possible by using a function such as beam control without performing radio resource control (RRC) reconfiguration. In other words, transmission to/reception from a non-serving cell is possible without performing handover. For handover, a period in which data communication is not possible occurs due to the necessity of RRC reconfiguration, for example. For this reason, L1/L2 inter-cell mobility without necessity of handover is preferable.

However, a cell radio network temporary identifier (C-RNTI) used in the serving cell may not be able to be used directly in transmission to/reception from a non-serving cell. This is because the C-RNTI used in the serving cell may be already used for another user terminal (User Equipment (UE)) in the non-serving cell, for example. When the same C-RNTI is used between UEs in the same cell, an issue is, for example, one UE can erroneously read downlink control information destined to another UE.

Thus, an object of the present disclosure is to provide a terminal, a radio communication method, and a base station that can appropriately select a C-RNTI.

Solution to Problem

A terminal according to one aspect of the present disclosure includes: a transmitting section that transmits capability information indicating support of update of at least part of radio resource control (RRC) parameters between a serving cell and a non-serving cell; and a control section that assumes, when the capability information is transmitted, different cell radio network identifiers (C-RNTIs) in the serving cell and the non-serving cell.

Advantageous Effects of Invention

According to one aspect of the present disclosure, a C-RNTI can be appropriately selected.

BRIEF DESCRIPTION OF DRAWINGS

FIGS. 1A to 1D are diagrams to show examples of a multi-TRP scenario.

FIG. 8 is a diagram to show an example of a TCI framework in Option 1 of Aspect 2-1.

FIG. 9 is a diagram to show an example of a TCI framework in Option 2 of Aspects 2-1 and 2-2.

FIG. 10 is a diagram to show an example of a TCI framework in Option 1 of Aspect 2-2.

FIG. 11 is a diagram to show an example of a TCI framework in Option 2 of Aspect 2-3.

FIG. 12 is a diagram to show an example of association between a non-serving cell index and a C-RNTI.

FIG. 13 is a diagram to show an example of a relationship between non-serving cell indices by RRC and various parameters.

FIG. 14 is a diagram to show an example of re-indexing of IDs of non-serving cells.

DESCRIPTION OF EMBODIMENTS

TCI, Spatial Relation, QCL

Figure 2A:
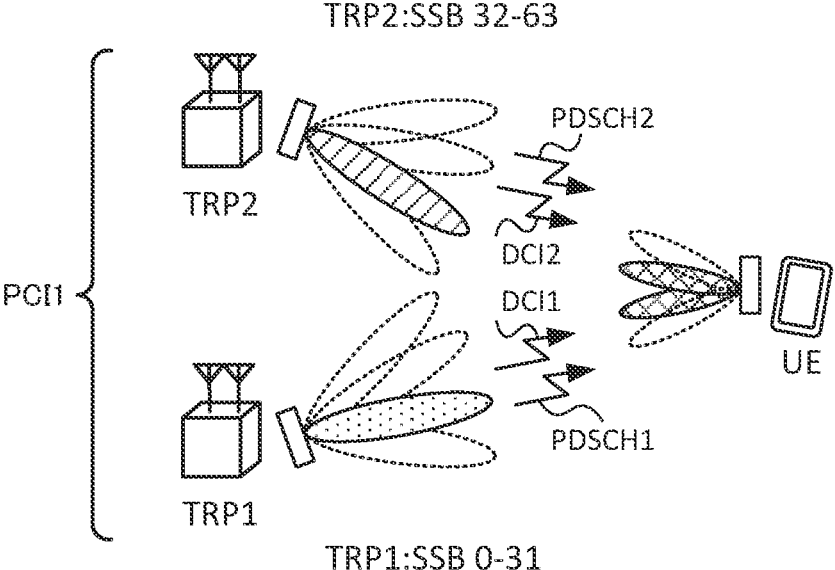
FIGS. 2A and 2B are diagrams to show examples of intra-cell mobility.

For NR, control of reception processing (for example, at least one of reception, demapping, demodulation, and decoding) and transmission processing (for example, at least one of transmission, mapping, precoding, modulation, and coding) of at least one of a signal and a channel (referred to as a signal/channel) in a UE, based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may mean that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have a different parameter(s) (or a parameter set(s)) that can be assumed to be the same, and such parameters (which may be referred to as QCL parameters) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

In the present disclosure, the higher layer signaling may be, for example, any one or combinations of Radio Resource Control (RRC) signaling, medium access control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state ("TCI-state IE" of RRC) configured using higher layer signaling may include one or a plurality of pieces of QCL information ("QCL-Info"). The QCL information may include at least one of information related to the RS to have a QCL relationship (RS relation information) and information indicating a QCL type (QCL type information). The RS relation information may include information such as an index of the RS (for example, an SSB index or a non-zero power CSI-RS (NZP CSI-RS) resource ID (Identifier)), an index of a cell in which the RS is located, and an index of a Bandwidth Part (BWP) in which the RS is located.

In Rel-15 NR, as a TCI state of at least one of a PDCCH and a PDSCH, both an RS of QCL type A and an RS of QCL type D or only an RS of QCL type A can be configured for a UE.

In a case where a TRS is configured as an RS of QCL type A, it is assumed that the same TRS is transmitted periodically over a long time period, unlike a demodulation reference signal (DMRS) of a PDCCH or a PDSCH. The UE measures the TRS to thereby be able to calculate an average delay, delay spread, and the like.

The UE configured with the TRS as the RS of QCL type A in the TCI state of the DMRS of the PDCCH or the PDSCH can assume that the parameters (average delay, delay spread, or the like) of QCL type A are the same for the DMRS of the PDCCH or the PDSCH and the TRS and can hence obtain the parameter (average delay, delay spread, or the like) of type A of the DMRS of the PDCCH or the PDSCH from the measurement result of the TRS. When the UE performs channel estimation for at least one of the PDCCH and the PDSCH, the UE can use the measurement result of the TRS to perform channel estimation at higher accuracy.

The UE configured with an RS of QCL type D can determine a UE receive beam (spatial domain reception filter, UE spatial domain reception filter) by using the RS of QCL type D.

An RS of QCL type X in a TCI state may mean an RS in a relationship of QCL type X with (a DMRS of) a certain channel/signal, and this RS may be referred to as a QCL source of QCL type X in the TCI state.

Multi-TRP

For NR, it is studied that one or a plurality of transmission/reception points (TRPs) (multi-TRP) perform DL transmission to a UE by using one or a plurality of panels (multi-panel). It is also studied that the UE performs UL transmission to the one or plurality of TRPs.

Note that the plurality of TRPs may correspond to the same cell identifier (ID) or may correspond to different cell IDs. The cell ID may be a physical cell ID or a virtual cell ID.

FIGS. 1A to 1D are diagrams to show examples of a multi-TRP scenario. In these examples, it is assumed that each TRP can transmit four different beams, but this is not restrictive.

FIG. 1A shows an example of a case where only one TRP (TRP1 in this example) of multi-TRP performs transmission to a UE (which may be referred to as a single mode, a single TRP, and the like). In this case, TRP1 transmits both a control signal (PDCCH) and a data signal (PDSCH) to the UE.

FIG. 1B shows an example of a case where only one TRP (TRP1 in this example) of the multi-TRP transmits a control signal to the UE and the multi-TRP transmits data signals (which may be referred to as a single master mode). The UE receives PDSCHs transmitted from the multi-TRP, based on one piece of downlink control information (DCI).

FIG. 1C shows an example of a case where each of the multi-TRP transmits part of a control signal to the UE and the multi-TRP transmits data signals (which may be referred to as a master-slave mode). TRP1 may transmit part 1 of the control signal (DCI), and TRP2 may transmit part 2 of the control signal (DCI). Part 2 of the control signal may depend on part 1. The UE receives the PDSCHs transmitted from the multi-TRP, based on these parts of DCI.

FIG. 1D shows an example of a case where each of the multi-TRP transmits a separate control signal to the UE and the multi-TRP transmits data signals (which may be referred to as a multi-master mode). TRP1 may transmit a first control signal (DCI), and TRP2 may transmit a second control signal (DCI). The UE receives the PDSCHs transmitted from the multi-TRP, based on these pieces of DCI.

When a plurality of PDSCHs from multi-TRP (which may be referred to as multi-PDSCH (multiple PDSCHs)) are scheduled by using one piece of DCI as in FIG. 1B, the DCI may be referred to as single DCI (single PDCCH). When a plurality of PDSCHs from multi-TRP are scheduled by using a plurality of pieces of DCI as in FIG. 1D, the plurality of pieces of DCI may be referred to as multi-DCI (multi-PDCCH (multiple PDCCHs)).

Each TRP of the multi-TRP may transmit a different codeword (Code Word (CW)) and a different layer. As one mode of multi-TRP transmission, non-coherent joint transmission (NCJT) is studied.

In NCJT, for example, TRP1 performs modulation mapping on a first codeword, performs layer mapping, and transmits a first PDSCH in layers of a first number (for example, two layers) by using first precoding. TRP2 performs modulation mapping on a second codeword, performs layer mapping, and transmits a second PDSCH in layers of a second number (for example, two layers) by using second precoding.

Note that a plurality of PDSCHs (multi-PDSCH) transmitted by NCJT may be defined to partially or entirely overlap in terms of at least one of the time and frequency domains. In other words, the first PDSCH from a first TRP and the second PDSCH from a second TRP may overlap in terms of at least one of the time and frequency resources.

The first PDSCH and the second PDSCH may be assumed not to be in a quasi-co-location (QCL) relationship (not to be quasi-co-located). Reception of the multi-PDSCH may be interpreted as simultaneous reception of PDSCHs of a QCL type other than a certain QCL type (for example, QCL type D).

For URLLC for multi-TRP, it is studied to support PDSCH (transport block (TB) or codeword (CW)) repetition over multi-TRP. It is studied to support a scheme of repetition over multi-TRP in the frequency domain, the layer (space) domain, or the time domain (URLLC schemes, for example, schemes 1, 2a, 2b, 3, and 4). In scheme 1, multi-PDSCH from multi-TRP is space division multiplexed (SDMed). In schemes 2a and 2b, PDSCHs from multi-TRP is frequency division multiplexed (FDMed). In scheme 2a, a redundancy version (RV) is the same for the multi-TRP. In scheme 2b, an RV may be the same or may be different for the multi-TRP. In schemes 3 and 4, multi-PDSCH from multi-TRP is time division multiplexed (TDMed). In scheme 3, multi-PDSCH from multi-TRP is transmitted in one slot. In scheme 4, multi-PDSCH from multi-TRP is transmitted in different slots.

According to such a multi-TRP scenario, more flexible transmission control using a channel with high quality is possible.

In the multi-master mode as in FIG. 1D, a configuration that the same physical cell ID is configured for a plurality of TRPs (intra-TRP mobility, intra-cell TRP mobility, intra-cell mobility, intra-cell multi-TRP operation) and a configuration that different physical cell IDs are configured for a plurality of TRPs (inter-TRP mobility, inter-cell TRP mobility, inter-cell mobility, or inter-cell multi-TRP operation) are considered.

FIG. 2A is a diagram to show an example of intra-cell mobility. As shown in FIG. 2A, the same physical cell ID (PCI1) is configured for TRP1 and TRP2. In this case, an SSB (SSBindex) transmitted from TRP1 and an SSB transmitted from TRP2 need be different from each other. In the example in FIG. 2A, the SSB of TRP1 is 0-31, while the SSB of TRP2 is 32-63.

Figure 2B:
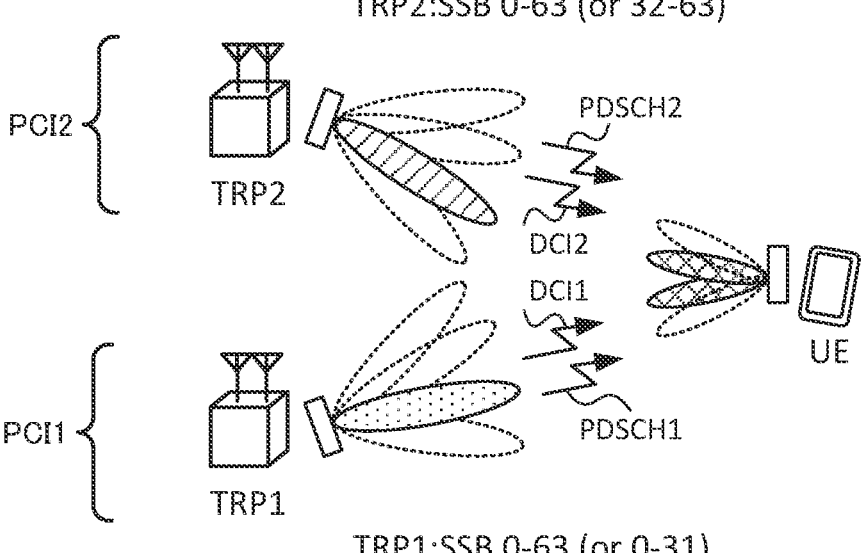

FIG. 2B is a diagram to show an example of inter-cell mobility. As shown in FIG. 2B, different physical cell IDs (PCI1, PGI2) are configured for TRP1 and TRP2. In this case, an SSB transmitted from TRP1 and an SSB transmitted from TRP2 may overlap or may be different from each other. In the example in FIG. 2B, the SSBs of TRP1 and TRP2 may be both 0-63. Alternatively, the SSB of TRP1 may be 0-31, while the SSB of TRP2 may be 32-63. In this case, an RS in a TCI state of PDSCH1/PDSCH2 is PCI1 or PGI2,

Unified/Common TCI Framework

According to a unified TCI framework, UL and DL channels can be controlled by a common framework. Instead of defining a TCI state or a spatial relation for each channel or each RS as in Rel. 15, the unified TCI framework may indicate a common beam and apply the common beam to all or part of a plurality of UL and DL channels and RSs, or apply a common beam for UL to all or part of a plurality of UL channels and RSs while applying a common beam for DL to all or part of a plurality of DL channels and RSs. For a certain channel or RS, the common beam may be applied to all resources or apply the common beam to part of (one or a plurality of) the resources. To which channel/RS to apply the common beam or to which resource to apply the common beam may be defined in a specification in advance or indicated to the UE by higher layer control information.

One common beam for both DL and UL or a common beam for DL and a common beam for UL (two common beams in total) are studied.

The UE may assume the same TCI state (joint TCI state, joint TCI pool) for UL and DL.

Figure 3:
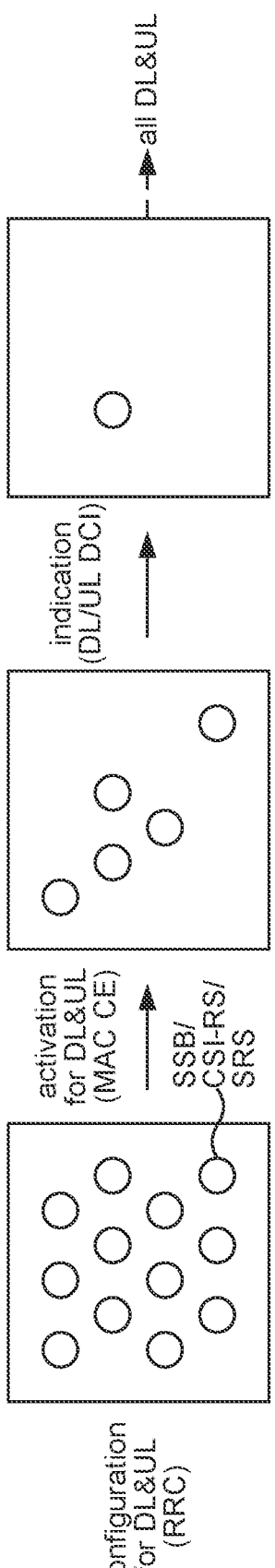
FIG. 3 is a diagram to show an example of joint common TCI indication for UL/DL.

FIG. 3 is a diagram to show an example of joint common TCI indication for UL/DL. In the example in FIG. 3, RRC (parameter, information element) configures a plurality of unified TCI states for both DL and UL. Each of the plurality of TCI states may have an SSB, CSI-RS, or an SRS as a QCL source RS. Note that each one circle sign shown in FIG. 3 (and FIG. 4 to be described later) may correspond to one or two TCI states for UL/DL/The MAC CE may activate at least part of the plurality of configured TCI states.

One piece of DCI for UL/DL may indicate one of the plurality of TCI states activated by a MAC CE. The indicated TCI state may be applied to one of or a subset of all ULs/DLs. One TCI state indicated by the DCI may be applied to both UL and DL. Two respective TCI states indicated by the DCI may be applied to UL/DL respectively.

For indication by DCI, a "TCI state" field in DCI for DL may be used, a new field for unified TCI in DCI for UL/DL (for example, "new unified-TCI" field) may be used, or a new field in a new DCI format applied to a unified TCI may be used.

As described above, in joint common TCI indication for UL/DL, one piece of DCI indicates both TCI for UL and TCI for DL.

Figure 4:
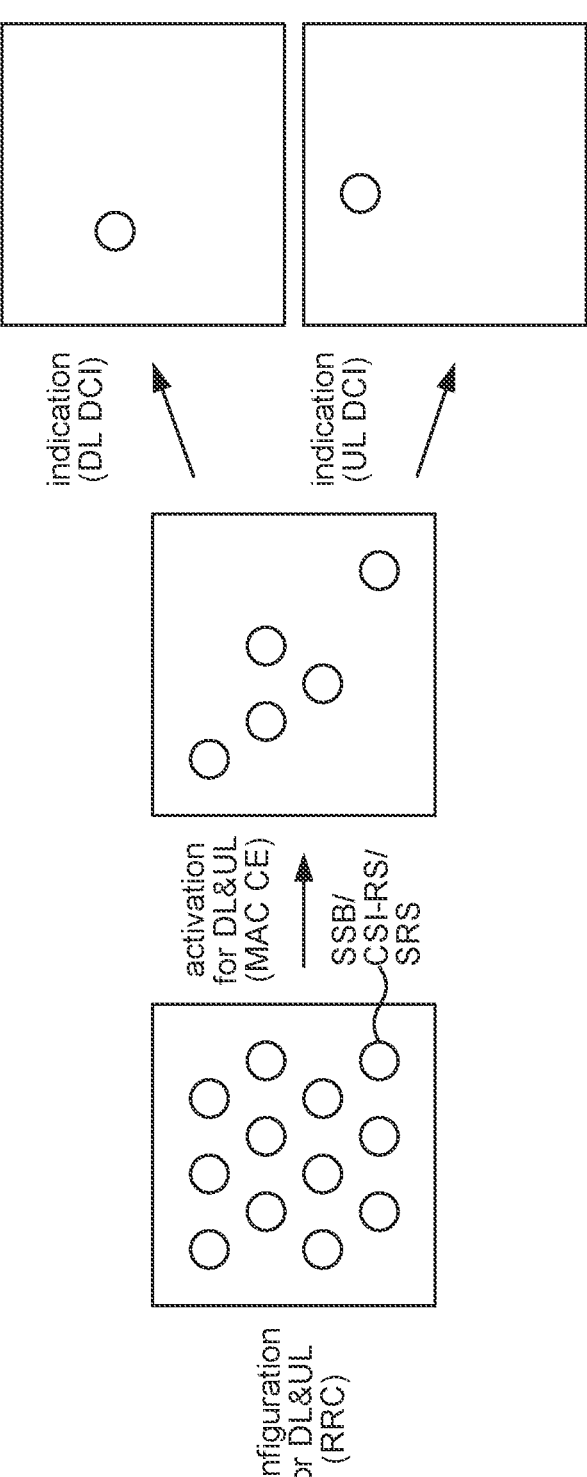
FIG. 4 is a diagram to show an example of an example of separate common TCI indication for UL/DL.

FIG. 4 is a diagram to show an example of separate common TCI indication for UL/DL. In the example in FIG. 4, RRC (parameter, information element) configures a plurality of unified TCI states for both DL and UL. Each of the plurality of TCI states may have an SSB, CSI-RS, or an SRS as a QCL source RS. The MAC CE may activate at least part of the plurality of configured TCI states. The one or more TCI states (TCI state pool) thus activated may be configured (activated) separately for UL and DL.

DCI for DL may indicate one of the plurality of TCI states activated by a MAC CE. The DCI may be a new DCI format applied to a unified TCI. The indicated TCI state may be applied to one of or a subset of all DLs.

DCI for UL may indicate one of the plurality of TCI states activated by a MAC CE. The DCI may be a new DCI format applied to a unified TCI. The indicated TCI state may be applied to one of or a subset of all ULs.

As described above, in separate common TCI indication for UL/DL, different pieces of DCI indicate respective separate TCI states for UL and DL.

L1/L2 Inter-Cell Mobility

Figure 5:
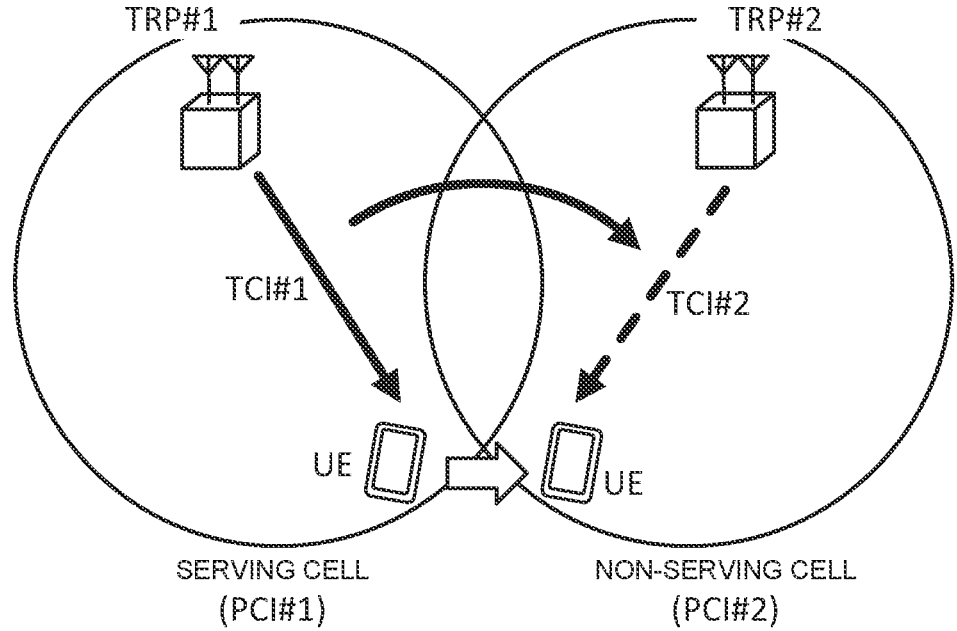
FIG. 5 is a diagram to show an example of switching of a TCI state.

FIG. 5 is a diagram to show an example of switching of a TCI state. A QCL source RS of TCI #1 relates to a serving cell, and a QCL source RS of TCI #2 relates to a non-serving cell. When the UE receives an indication of update from TCI

1 to TCI #2, the UE refers to a higher layer parameter (RRC parameter) related to a cell associated with TCI #2 to which the TCI state is updated.

The UE may support inter-PCI dynamic point selection (DPS) when the UE performs reception only from one TRP at one time. In methods in Rel. 16 (or previous versions), a UE explicitly updates a TCI state by RRC/MAC CE/DCI, or updates a TCI state, based on the newest (latest) PRACH transmission to update (handover) a PCI (cell).

Note that intra-cell mobility and inter-cell mobility are not limited to a configuration of multi-TRP.

Layer 1/layer 2 (L1/L2) inter-cell mobility that facilitates more efficient DL/UL beam management (that achieves lower latency and overhead) is studied. For example, by assuming multi-DCI-based multi-PDSCH reception, QCL/TCI related enhancement that enables inter-cell multi-TRP operation may be performed.

In L1/L2 inter-cell mobility, serving cell change is possible by using a function such as beam control without performing RRC reconfiguration. In other words, transmission to/reception from a non-serving cell is possible without performing handover. For handover, a period in which data communication is not possible occurs due to the necessity of RRC reconfiguration, for example. For this reason, L1/L2 inter-cell mobility without necessity of handover is preferable.

However, a C-RNTI used in the serving cell may not be able to be used directly in transmission to/reception from a non-serving cell. This is because the C-RNTI used in the serving cell may be already used for another UE in the non-serving cell, for example. When the same C-RNTI is used between UEs in the same cell, an issue is that, for example, one UE can erroneously read DCI destined to another (can erroneously solve cyclic redundancy check (CRC) scrambling of DCI destined to another).

Thus, the inventors of the present invention came up with the idea of a method for appropriately selecting a C-RNTI. According to one aspect of the present disclosure, high-speed inter-cell mobility can be achieved, for example.

Embodiments according to the present disclosure will be described in detail with reference to the drawings as follows. The radio communication methods according to respective embodiments may each be employed individually, or may be employed in combination.

Note that in the present disclosure, "A/B" may be interpreted as "at least one of A and B."

Note that in the present disclosure, a panel, an Uplink (UL) transmission entity, a point, a TRP, a TRP-ID, a TRP ID, a spatial relation, a control resource set (COntrol REsource SET (CORESET)), a PDSCH, a codeword, a base station, a certain antenna port (for example, a demodulation reference signal (DMRS) port), a certain antenna port group (for example, a DMRS port group), a certain group (for example, a code division multiplexing (CDM) group, a certain reference signal group, or a CORESET group), and a CORESET pool may be interchangeably interpreted. A panel Identifier (ID) and a panel may be interchangeably interpreted.

In the present disclosure, a cell, a CC, a carrier, a BWP, and a band may be interchangeably interpreted.

In the present disclosure, an index, an ID, an indicator, and a resource ID may be interchangeably interpreted.

In the resent disclosure, a TCI state may be information (for example, a cell in which a DL-RS, a QCL type, or a DL-RS is transmitted or the like) related to a receive beam (spatial domain reception filter) indicated to (configured for) a UE. QCL assumption may be information (for example, a cell in which a DL-RS, a QCL type, or a DL-RS is transmitted or the like) related to a receive beam (spatial domain reception filter) assumed by a UE, based on transmission or reception of an associated signal (for example, a PRACH).

In the present disclosure, a spatial relation, spatial relation information (SRI), spatial relation assumption, a QCL parameter, a spatial domain transmission filter, a UE spatial domain transmission filter, a spatial domain filter, a UE transmit beam, a UL transmit beam, UL precoding, a UL precoder, an RS of a spatial relation, a DL-RS, QCL assumption, an SRI, a spatial relation based on an SRI, and a UL TCI may be interchangeably interpreted.

In the present disclosure, a TRS, a CSI-RS for tracking, a CSI-RS including TRS information (higher layer parameter trs-Info), and an NZP-CSI-RS resource in an NZP-CSI-RS resource set including TRS information may be interchangeably interpreted.

In the present disclosure, a beam, a spatial domain filter, spatial setting, a TCI, a TCI state, a TCI state pool, a plurality of TCI states, a UL TCI state, a unified TCI state, a unified beam, a common TCI state, a joint TCI state, a common beam, QCL assumption, QCL information, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state or QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, a DL-RS having QCL type X, a DL-RS source, an SSB, a CSI-RS, and an SRS may be interchangeably interpreted.

In the present disclosure, a normal TRP, a single TRP, a single-TRP system, single-TRP transmission, and a single PDSCH may be interchangeably interpreted. In the present disclosure, multi-TRP, multi-TRP system, multi-TRP transmission, and multi-PDSCH may be interchangeably interpreted. In the present disclosure, single DCI, a single PDCCH, multi-TRP based on single DCI, and two TCI states in at least one TCI codepoint being activated may be interchangeably interpreted.

In the present disclosure, a single TRP, a channel using a single TRP, a channel using one TCI state/spatial relation, multi-TRP being not enabled by RRC/DCI, a plurality of TCI states/spatial relations being not enabled by RRC/DCI, one CORESET pool index (CORESETPoolIndex) value being not configured for any CORESET and any codepoint of a TCI field being not mapped to two TCI states, performing communication with one transmission/reception point, and applying a single TRP may be interchangeably interpreted.

In the present disclosure, multi-TRP, a channel using multi-TRP, a channel using a plurality of TCI states/spatial relations, multi-TRP being enabled by RRC/DCI, a plurality of TCI states/spatial relations being enabled by RRC/DCI, and at least one of multi-TRP based on single DCI and multi-TRP based on multi-DCI may be interchangeably interpreted. In the present disclosure, multi-TRP based on multi-DCI and one CORESET pool index (CORESET-PoolIndex) value being configured for a CORESET may be interchangeably interpreted. In the present disclosure, multi- TRP based on single DCI and at least one codepoint in a TCI field being mapped to two TCI states may be interchangeably interpreted.

In the present disclosure, assumption, holding, maintaining, selection, and judgment may be interchangeably interpreted.

Radio Communication Method

In one embodiment of the present disclosure, a UE uses a selected C-RNTI. Using a C-RNTI, performing detection (blind detection) of a PDCCH by using a C-RNTI, performing decoding of a PDSCH by using a C-RNTI, performing scrambling for a PUCCH/PUSCH by using a C-RNTI, and the like may be interchangeably interpreted. This is because a C-RNTI is used for CRC scrambling of a PDCCH (DCI), scrambling of data (information bits) of a PDSCH/PUCCH/PUSCH, and the like.

How may non-serving cells the UE assume (how many non-serving cells the UE controls transmission/reception with, in other words, the number of non-serving cells with which the UE can perform transmission/reception) may be defined in a specification in advance, configured for the UE by higher layer signaling (for example, RRC/MAC CE), or determined based on UE capability.

The UE may hold/assume C-RNTIs of the number of defined/configured/assumed/determined non-serving cells in addition to the C-RNTI of the serving cell.

The UE may use the C-RNTI of each non-serving cell for transmission/reception with the non-serving cell (for example, at least transmission/reception in the physical layer (detection of a PDCCH, descrambling of data of a PDSCH, and the like)).

Note that a "C-RNTI" in the present disclosure may be interpreted as any identifier (for example, another RNTI). A PCI in the present disclosure may be interpreted as an identifier related to a cell (for example, a cell index, a serving cell index, and the like), and vice versa. In the present disclosure, beam indication, indication of update of a beam/TCI, and indication of update of a cell/serving cell/non-serving cell may be interchangeably interpreted.

First Embodiment

Aspect 1-1

The UE may assume (hold, maintain) a single C-RNTI for TCI states/PCIs associated with a serving cell and a non-serving cell. When the serving cell (PCI of the serving cell) associated with a QCL source RS in a TCI state is updated by a beam indication (indication related to a beam/indication of update of a TCI/indication of update of the serving cell), C-RNTI assumption is not updated. The UE assumes the single C-RNTI for UL transmission/DL reception of a channel/RS.

Figure 6:
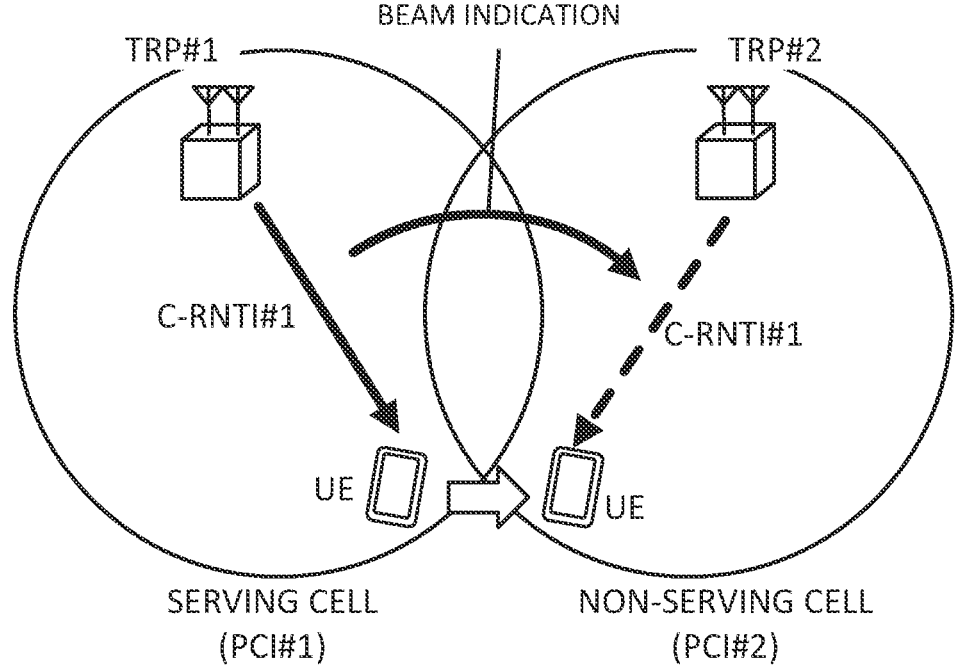
FIG. 6 is a diagram to show an example of C-RNTI assumption in Aspect 1-1.

FIG. 6 is a diagram to show an example of C-RNTI assumption in Aspect 1-1. In the example in FIG. 6, the UE assumes C-RNTI #1 for both the serving cell and the non-serving cell. Even when the serving cell is updated from the cell of PCI #1 to a cell of PCI #2 by beam indication, C-RNTI assumption is not updated.

Aspect 1-2

When the UE assumes (holds, maintains) multi-C-RNTI (a plurality of C-RNTIs) and receives a beam indication (indication related to a beam/indication of update of a TCI/indication of update of the serving cell) and when the serving cell is updated by the beam indication, the UE may select one C-RNTI from among the plurality of C-RNTIs, based on the beam indication. When the serving cell (PCI of the serving cell) associated with a QCL source RS in a TCI state is updated by beam indication, C-RNTI assumption is updated. The UE assumes the C-RNTI obtained by the update, for UL transmission/DL reception of a channel/RS.

Figure 7:
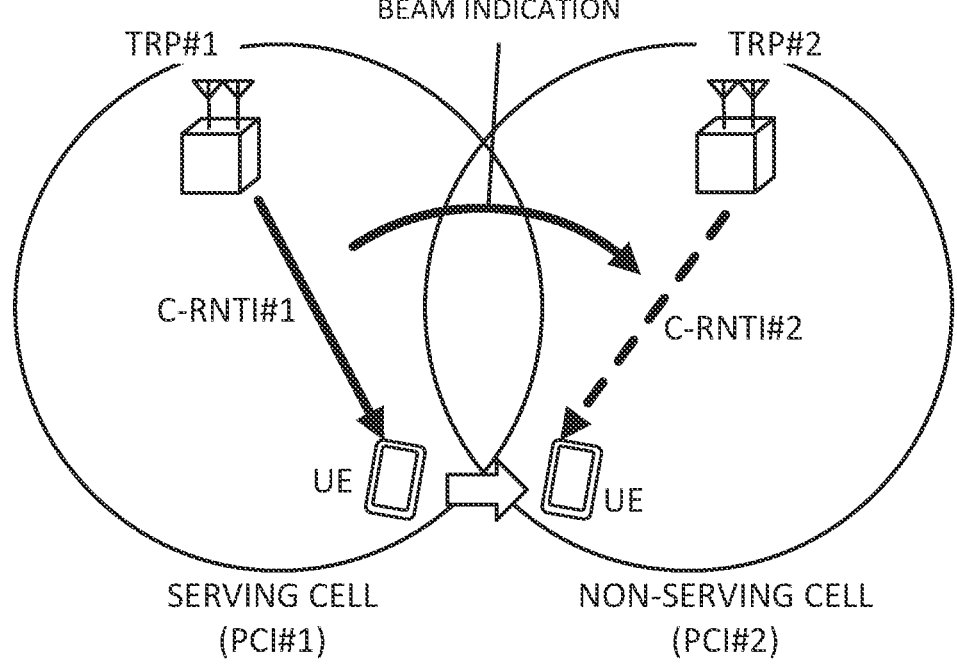
FIG. 7 is a diagram to show an example of C-RNTI assumption in Aspect 1-2.

FIG. 7 is a diagram to show an example of C-RNTI assumption in Aspect 1-2. In the example in FIG. 7, the UE assumes C-RNTI #1 for the serving cell and assumes C-RNTI #2 for the non-serving cell. When the serving cell is updated from the cell of PCI #1 to the cell of PCI #2 by beam indication, C-RNTI assumption is updated.

Second Embodiment

A second embodiment relates to control of individual channels when a plurality of C-RNTIs are assumed as in Aspect 1-2.

In the present disclosure, a TCI state, a unified TCI state, a CORESET, an SRI, and a spatial relation may be interpreted as a TCI state group, a unified TCI state group, a CORESET group, an SRI group, and a spatial relation group, respectively.

Aspect 2-1

A C-RNTI is used for CRC scrambling of a PDCCH. In view of this, the UE preferably knows which C-RNTI is to be used for PDCCH detection before blind detection (decoding). When the UE does not know the C-RNTI to be used, processing of decoding a PDCCH (DCI) by the UE is more complex.

The UE may select a C-RNTI, based on a PCI to be used for reception of a CORESET (PDCCH). Here, association between a C-RNTI and a serving cell index (PCI) may be configured in advance by higher layer signaling or the like, reported by the UE, or determined/configured based on UE capability reported by the UE.

Option 1

The UE may select (determine) a C-RNTI according to beam indication based on a TCI framework of Rel. 15 (TCI state/CORESET corresponding to the serving cell obtained by update). The serving cell index or PCI may be configured for each TCI state or CORESET. The TCI state corresponding to the CORESET may be indicated (configured) by RRC/MAC CE/DCI of Rel. 15/16. The UE may use the C-RNTI associated with the serving cell (PCI) associated with the TCI state or CORESET for blind detection. The serving cell associated with the TCI state/CORESET may be a non-serving cell.

Figure 8:
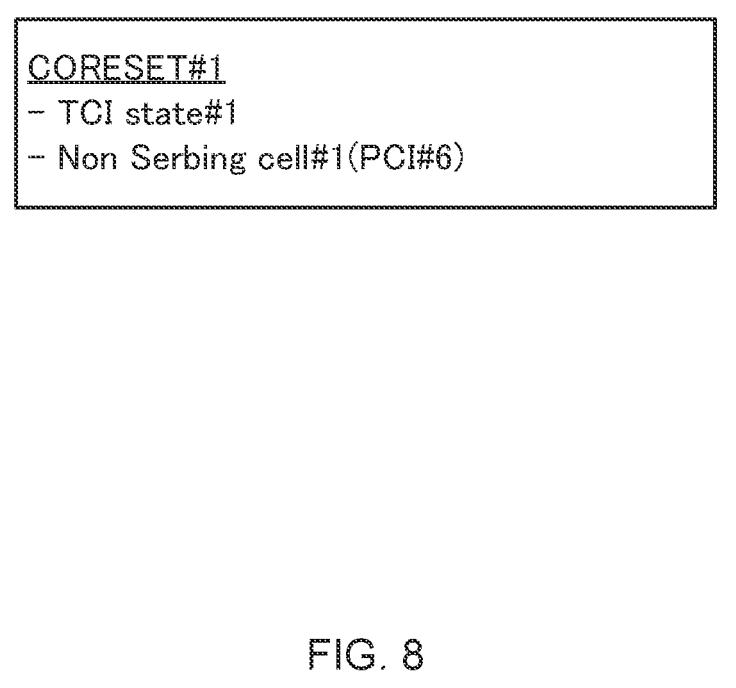

FIG. 8 is a diagram to show an example of a TCI framework in Option 1 of Aspect 2-1. In the example in FIG. 8, a CORESET, a TCI state, and a non-serving cell index (PCI) are associated with each other. The information shown in FIG. 8 may be indicated to (configured for) the UE by RRC/MAC CE/DCI. In a case of monitoring a PDCCH in CORESET #1 or by using TCI state #1, the UE may use the C-RNTI corresponding to non-serving cell #1 (PCI #6) associated with CORESET #1 or TCI state #1, for the detection of the PDCCH. The non-serving cell may be replaced with a serving cell.

Option 2

The UE may select (determine) a C-RNTI, according to a beam indication based on a unified TCI framework of Rel.

17 (unified TCI state/CORESET corresponding to the serving cell obtained by update). The serving cell index or PCI may be indicated for each unified TCI state or CORESET. The TCI state corresponding to the CORESET may be indicated by RRC/MAC CE/DCI in the unified TCI framework of Rel. 17. The UE may use the C-RNTI associated with the serving cell (PCI) associated with the unified TCI state or CORESET for blind detection. The serving cell associated with the unified TCI state/CORESET may be a non-serving cell.

FIG. 9 is a diagram to show an example of a TCI framework in Option 2 of Aspects 2-1 and 2-2. In the example in FIG. 9, unified-TCI codepoints, unified TCI states, and serving cell and non-serving cell indices (PCIs) are associated with each other. The information shown in FIG. 9 may be indicated to (configured for) the UE by RRC/MAC CE/DCI. In a case of monitoring a PDCCH by using a unified TCI state corresponding to the indicated unified-TCI codepoint, the UE may use the C-RNTI corresponding to the serving cell/non-serving cell associated with the unified TCI state, for detection of the PDCCH.

Variations

The serving cell index or PCI may be configured for each TCI state. Moreover, a non-serving flag (x bit(s)) may be used for saving RRC overhead. For example, to show three non-serving cells at maximum, a two-bit flag may be used to show one of {serving cell, non-serving cell #1, non-serving cell #2, non-serving cell #3}. In this case, association of a serving cell index (or PCI) and non-serving cell #1/#2/#3 may be configured in advance by higher layer signaling or the like. These variations are applicable to Option 1/Option 2.

Aspect 2-2

A C-RNTI is used for data scrambling (initialization of scrambling of a PDSCH). In view of this, the UE preferably knows which C-RNTI is to be used for PDSCH reception before receiving a PDSCH.

The UE may select a C-RNTI, based on a PCI to be used for reception of a PDSCH. Here, association between a C-RNTI and a serving cell index (PCI) may be configured in advance by higher layer signaling or the like, reported by the UE, or determined/configured based on UE capability reported by the UE.

Option 0

The UE may select (determine) a C-RNTI for PDSCH data scrambling, based on information (C-RNTI/serving cell/PCI) corresponding to scheduling DCI for the PDSCH. For example, the same C-RNTI as the C-RNTI used for CRC scrambling of the scheduling DCI may also be used for the PDSCH scheduled by the DCI. For a C-RNTI of a PDSCH, a different C-RNTI may be selected depending on whether the scheduling DCI is for a serving cell or a non-serving cell (or the serving cell index/PCI corresponding to the scheduling DCI). For example, association between a C-RNTI of a PDSCH and a serving cell index/PCI may be configured in advance by higher layer signaling or the like, and the UE may select a C-RNTI, based on the association.

Option 1

The UE may select (determine) a C-RNTI, according to a beam indication based on a TCI framework of Rel. 15 (TCI state corresponding to the serving cell obtained by update). The serving cell index or PCI may be configured for each TCI state. The TCI state of the PDSCH may be indicated (configured) by RRC/MAC CE/DCI of Rel. 15/16. The UE may use the C-RNTI associated with the serving cell (PCI) associated with the TCI state, for PDSCH reception.

FIG. 10 is a diagram to show an example of a TCI framework in Option 1 of Aspect 2-2. In the example in FIG. 10, TCI state codepoints (TCI points), TCI states, and serving cell and non-serving cell indices (PCIs) are associated with each other. The information shown in FIG. 10 may be indicated to (configured for) the UE by RRC/MAC CE/DCI. In a case of receiving a PDSCH by using a TCI state corresponding to the indicated TCI codepoint, the UE may use the C-RNTI corresponding to the serving cell/non-serving cell associated with the TCI state, for the reception of the PDSCH.

Option 2

The UE may select (determine) a C-RNTI, according to a beam indication based on a unified TCI framework of Rel. 17 (unified TCI state corresponding to the serving cell obtained by update). The serving cell index or PCI may be indicated for each unified TCI state. The TCI state of the PDSCH may be indicated by RRC/MAC CE/DCI in the unified TCI framework of Rel. 17. The UE may use the C-RNTI associated with the serving cell (PCI) associated with the unified TCI state, for PDSCH reception. For association between unified TCI states and a serving cell (PCI), information similar to that in the example in FIG. 9 may be indicated to (configured for) the UE by RRC/MAC CE.

The variations of Aspect 2-1 above may also be applied to each option of Aspect 2-2.

Aspect 2-3

A C-RNTI is used for data scrambling (initialization of scrambling of a PUSCH). In view of this, the UE preferably knows which C-RNTI is to be used for PUSCH reception before transmitting a PUSCH.

The UE may select a C-RNTI, based on a PCI to be used for transmission of a PUSCH. Here, association between a C-RNTI and a serving cell index (PCI) may be configured in advance in a specification, reported by the UE, or determined/configured based on UE capability reported by the UE.

Option 0

The UE may select (determine) a C-RNTI for PUSCH data scrambling, based on information (C-RNTI/serving cell/PCI) corresponding to scheduling DCI for the PUSCH. For example, the same C-RNTI as the C-RNTI used for CRC scrambling of the scheduling DCI may also be used for the PUSCH scheduled by the DCI. For a C-RNTI of a PUSCH, a different C-RNTI may be selected depending on whether the scheduling DCI is for a serving cell or a non-serving cell (or the serving cell index/PCI corresponding to the scheduling DCI). For example, association between a C-RNTI of a PUSCH and a serving cell index/PCI may be configured in advance by higher layer signaling or the like, and the UE may select a C-RNTI, based on the association.

Option 1

The UE may select (determine) a C-RNTI according to beam indication based on a TCI/Sounding Reference Signal (SRS) Resource Index (SRI) framework of Rel. 15 (TCI state/SRI/spatial relation corresponding to the serving cell obtained by update). The serving cell index or PCI may be configured for each TCI state/SRI/spatial relation. The TCI state/SRI/spatial relation of the PUSCH may be indicated (configured) by RRC/MAC CE/DCI of Rel. 15/16. The UE may use the C-RNTI associated with the serving cell (PCI) associated with the TCI state/SRI/spatial relation, for PUSCH transmission.

FIG. 11 is a diagram to show an example of a TCI framework in Option 2 of Aspect 2-3. In the example in FIG. 11, values of an SRI field, SRIs, and serving cell indices (PCIs) are associated with each other. The information shown in FIG. 11 may be indicated to (configured for) the UE by RRC/MAC CE/DCI.

Option 2

The UE may select (determine) a C-RNTI, according to a beam indication based on a unified TCI framework of Rel. 17 (unified TCI state corresponding to the serving cell obtained by update). The serving cell index or PCI may be indicated for each unified TCI state. The TCI state of a PUSCH may be indicated (configured) by RRC/MAC CE/DCI of the Rel-17 unified TCI framework for both of the cases of joint common TCI indication for DL/UL and separate common TCI indication for DL/UL. The UE may use the C-RNTI associated with the serving cell (PCI) associated with the unified TCI state, for PUSCH transmission. For association between unified TCI states and a serving cell (PCI), information similar to that in the example in FIG. 9 may be indicated to (configured for) the UE by RRC/MAC CE.

An example where "for each TCI state" in the variations of Aspect 2-1 above with "for each TCI state/SRI/spatial relation" may also be applied to each option of Aspect 2-3.

According to the second embodiment, the UE can appropriately select a C-RNTI of multi-C-RNTI, to be used for each of a PDCCH, a PDSCH, and a PUSCH.

Third Embodiment

The multi-C-RNTI may be configured by higher layer signaling or may be reported by the UE by a MAC CE. Association between a non-serving cell index (PCI) and a C-RNTI may be configured for the UE by RRC/MAC CE/DCI. When the association is configured by a MAC CE/DCI, RRC reconfiguration for updating the association is avoided. The C-RNTI of the serving cell may be determined according to a rule similar to that of Rel. 15/16.

FIG. 12 is a diagram to show an example of association between non-serving cell indices and C-RNTIs. The association between the non-serving cell indices (PCIs) and C-RNTIs shown in FIG. 12 may be configured for the UE by RRC/MAC CE/DCI. The UE may report association as that shown in FIG. 12 to a network (base station) by a MAC CE or the like. For example, in FIG. 12, non-serving cell index #1 corresponds to PCI #245 and is associated with correspond to C-RNTI #1.

The number of RRC configurable non-serving cells may be limited. The number may be 1 or 3, for example. To change the serving cell to a cell other than the non-serving cell(s) configured by RRC, RRC reconfiguration may be performed.

When a MAC CE can update association between a non-serving cell index configured by RRC and actual non-serving cell index/PCI/C-RNTI, RRC reconfiguration can be avoided. The "actual non-serving cell index" may mean the index of a non-serving cell which the UE can actually use. For example, the MAC CE may include at least one of a non-serving cell index configured by RRC, a PCI value related to a non-serving cell index, a C-RNTI value, an RRC parameter in ServingCellConfig, and the like. Alternatively, RRC may configure a plurality of patterns indicating association between an actual non-serving cell index and a PCI value, a C-RNTI value, an RRC parameter in ServingCell-Config, and the like, and MAC CE may indicate a pattern index corresponding to the non-serving cell index configured by RRC among the plurality of patterns.

FIG. 13 is a diagram to show an example of a relationship between actual non-serving cell indices by RRC and various parameters. The example in FIG. 13 shows a relationship between non-serving cell indices (or non-serving cell flags described above) and actual non-serving cell indices, PCIs, and C-RNTIs. For example, a configuration as that in FIG. 13 may be transmitted to the UE by RRC, and an actual non-serving cell, a PCI, and a C-RNTI may be updated by a MAC CE.

FIG. 14 is a diagram to show an example of re-indexing of IDs of non-serving cells. Association between non-serving cell indices obtained by re-indexing (Re-indexing IDs) and PCI values as shown in FIG. 14 may be configured for the UE by RRC. For example, a MAC CE may update the indices obtained by re-indexing instead of the non-serving cell indices and the PCIs in FIG. 13. By using the indices obtained by re-indexing, the number of information bits is reduced, which can reduce the overhead of RRC signaling.

Figure 15:
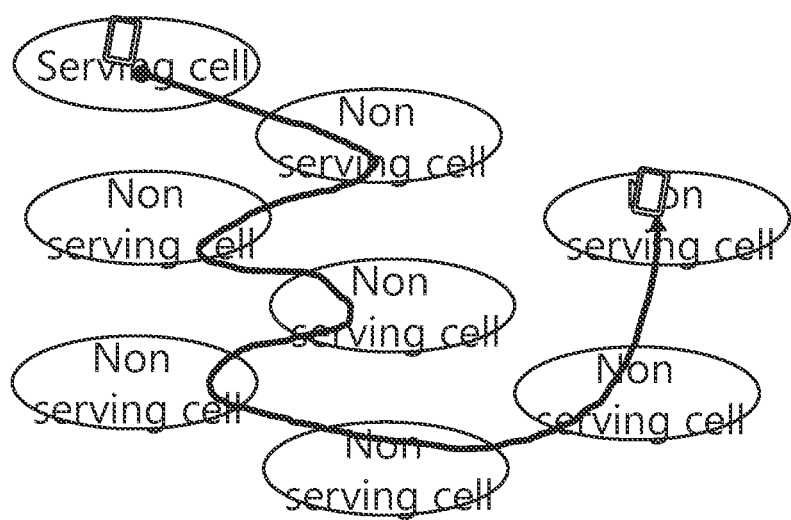
FIG. 15 is a diagram to show an example of inter-cell movement of a UE.

FIG. 15 is a diagram to show an example of inter-cell movement of the UE. In the example in FIG. 15, the UE sequentially moves from a serving cell to a plurality of non-serving cells (seven non-serving cells). For example, when the number of RRC configurable non-serving cells is three, handover of Rel. 15 is needed. However, by the UE updating non-serving cell information by a MAC CE, handover can be reduced.

Fourth Embodiment

Figure 16:
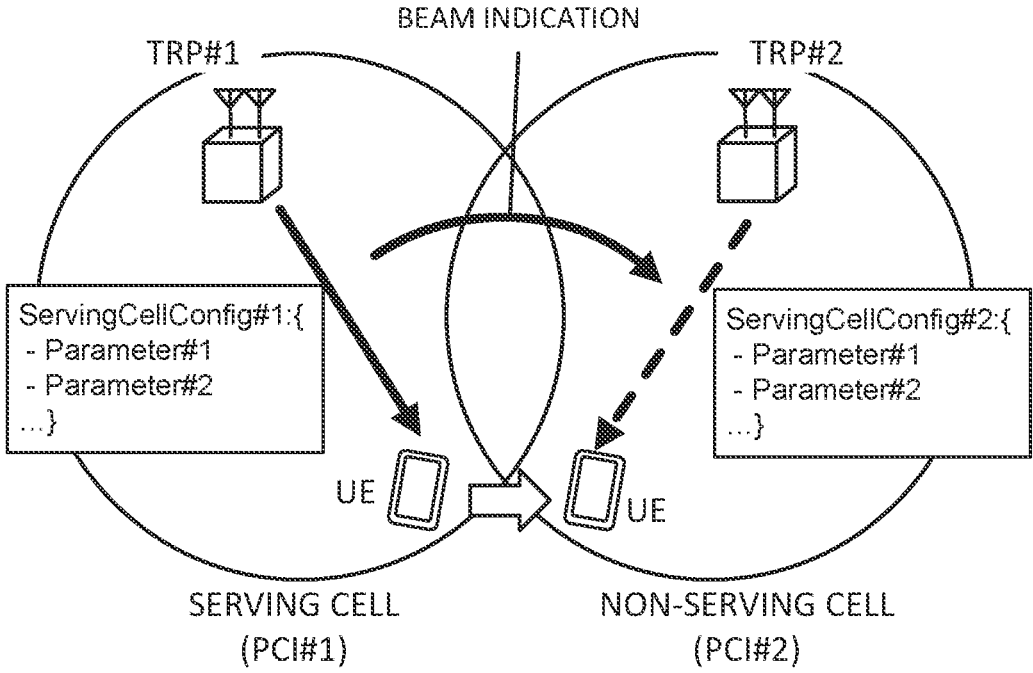
FIG. 16 is a diagram to show an example of RRC parameters of a serving cell and a non-serving cell.

When at least part of RRC parameters (configurations) are different between a serving cell and a non-serving cell, the UE need maintain two sets of configurations and apply a different set of configurations to a PDCCH/PDSCH from a different cell. In this case, there is an issue that complexity of UE operation increases. FIG. 16 is a diagram to show an example of RRC parameters of a serving cell and a non-serving cell. In the example in FIG. 16, an RRC parameter of the serving cell (ServingCellConfig #1) and an RRC parameter of the non-serving cell (ServingCellConfig #2) are different from each other. Note that, although a case where the RRC parameter of the non-serving cell is also configured of an RRC information element ServingCellConfig is described in the present disclosure, this is not restrictive. The RRC parameter of the non-serving cell may be configured by using a configuration for a non-serving cell (for example, an information element NonServingCellConfig).

To solve the above issue, the UE may report (transmit) UE capability (UE capability information) indicating support of dynamic update (change) of at least part of RRC parameters (configurations) between the serving cell and the non-serving cell (for example, in a case of switching from the serving cell to the non-serving cell or the other way around (case of updating a TCI state/beam)). The UE may then use, when the cells are switched, an RRC parameter for the cell to be switched to. The UE judges whether different C-RNTIs are held by the serving cell and the non-serving cell according to whether the UE has transmitted the UE capability information.

When the UE does not support the UE capability (when the UE has reported that the UE does not support the UE capability), the UE need not assume that different RRC parameters (for example, at least part of parameters ServingCellConfig) are configured in the serving cell and the non-serving cell. When the UE does not support the UE capability (when the UE has reported that the UE does not support the UE capability), the UE need not assume that different C-RNTIs are held in the serving cell and the non-serving cell. When the UE supports the UE capability (when the UE has reported that the UE supports the UE capability), the UE may hold/assume/select different C-RN-TIs in the serving cell and the non-serving cell.

The processing of the fourth embodiment may be applied in combination with Aspect 1-1 or Aspect 1-2 of the first embodiment, for example.

Fifth Embodiment

When the serving cell associated with a QCL source RS in a TCI state is updated by beam indication (to another cell), the UE may assume/judge/select a C-RNTI, based on whether the "serving cell" in an existing specification is updated. This C-RNTI is a single C-RNTI (Aspect 1-1) or multi-C-RNTI (Aspect 1-2) of the first embodiment.

Aspect 5-1

When the UE receives a beam indication associated with a QCL source RS in a TCI state (indication related to a non-serving cell), the UE may judge that the serving cell is not updated to the non-serving cell.

For the "serving cell," without being updated in L1/L2 inter-cell mobility, definition of the existing specification may be reused. In other words, the "serving cell" may correspond to a special cell (primary cell, primary secondary cell) and a secondary cell. The "serving cell" may correspond to a cell for which an RRC parameter is configured by a ServingCellConfig information element.

In Aspect 5-1, the difference between the serving cell and the non-serving cell is whether the QCL source RS corresponding to the TCI state/SRI/spatial relation is associated with the serving cell or the non-serving cell.

In Aspect 5-1, for example, even when the UE receives a beam indication as in FIG. 16, for example, the serving cell is not updated (not updated from PCI #1).

Both a single C-RNTI (Aspect 1-1) or multi-C-RNTI (Aspect 1-2) of the first embodiment are applicable to Aspect 5-1. A single C-RNTI being applied may mean that the C-RNTI of the serving cell is always used for UL transmission/DL reception of a UE-specific channel/RS irrespective of the QCL source associated with the serving cell or the non-serving cell.

When the serving cell is not updated, CORESET #0/UE-group common CORESET may be configured to have the TCI state corresponding only to the serving cell (or to be related to the TCI state), and only a UE-specific CORESET and a UE-specific PDSCH may be configured to have the TCI state corresponding to the non-serving cell (or to be related to the TCI state).

A different RRC parameter (at least part of ServingCell-Config)/different C-RNTI may be used according to a CORESET associated with UL transmission/DL reception.

For example, a PDSCH is scheduled by DCI received in a common CORESET or a UE-specific CORESET. For example, an RRC parameter or a C-RNTI to be used for UL transmission/DL reception may be judged based on at least one of (1) and (2) below.

(1) When CORESET #0/UE-group common CORESET (search space) is associated with the UL transmission/ DL reception, at least one of an RRC parameter for serving cell (at least part of ServingCellConfig) and a C-RNTI for serving cell may be used.

(2) When another CORESET/UE-specific CORESET (search space) is associated with the UL transmission/ DL reception, at least one of an RRC parameter for non-serving cell (at least part of ServingCellConfig) and a C-RNTI for non-serving cell may be used.

Aspect 5-2

When the UE receives a beam indication related to a QCL source RS in a TCI state (indication related to a non-serving cell), the UE may judge that the serving cell is updated to the non-serving cell.

The "serving cell" may be updated in L1/L2 inter-cell mobility. When the serving cell associated with a QCL source RS in a TCI state/SRI/spatial relation is updated by beam indication, "serving cell" assumption" may be updated. In this case, the RRC configuration to be used (at least part of ServingCellConfig) and the C-RNTI may be updated according to the "serving cell" assumption. To avoid RRC reconfiguration, multi-set of update RRC parameters (at least part of ServingCellConfig)/C-RNTIs may be configured in advance as described in the fourth embodiment, and the UE may select one of the RRC parameters/ C-RNTIs according to a beam indication.

Both a single C-RNTI (Aspect 1-1) and multi-C-RNTI (Aspect 1-2) of the first embodiment are applicable to Aspect 5-2. In a case where a single C-RNTI is applied, the UE has one C-RNTI, and update is performed by RRC reconfiguration/random access procedure in L1/L2 inter-cell mobility. In a case where multi-C-RNTI is applied, the UE may hold/maintain a plurality of C-RNTIs and select one C-RNTI according to a beam indication.

In Aspect 5-2, for example, when the UE receives a beam indication as in FIG. 16, the serving cell is updated (updated from PCI #1 to PCI #2).

When the serving cell can be updated, CORESET #0/UE-group common CORESET may be configured to have the TCI state corresponding to the non-serving cell (or to be related to the TCI state).

The same RRC parameter (at least part of ServingCell-Config)/same C-RNTI may be used irrespective of a CORESET associated with UL transmission/DL reception. For example, a PDSCH is scheduled by DCI received in a common CORESET or a UE-specific CORESET. For example, an RRC parameter or a C-RNTI to be used for UL transmission/DL reception may be judged based on at least one of (1) and (2) below.

(1) When CORESET #0/UE-group common CORESET (search space) is associated with the UL transmission/ DL reception, at least one of an RRC parameter for serving cell (at least part of ServingCellConfig) and a C-RNTI for serving cell may be used.

(2) When another CORESET/UE-specific CORESET (search space) is associated with the UL transmission/ DL reception, at least one of an RRC parameter for serving cell (at least part of ServingCellConfig) and a C-RNTI for serving cell may be used.

According to the fifth embodiment, the UE can appropriately select/assume a C-RNTI in each of a case where a serving cell is updated and a case where a serving cell is not updated.

Sixth Embodiment

For example, any combination of Case A and Case B below (for example, combinations of A1 and B1, A1 and B2, A2 and B1, and A2 and B2) may be allowed. In all the examples of Case A and Case B, both a single C-RNTI (Aspect 1-1) and multi-C-RNTI (Aspect 1-2) of the first embodiment are applicable.

Case A (A1) The "serving cell" is updated when the UE performs UL transmission/DL reception of a channel/RS on a non-serving cell (in other words, when a QCL source RS of UL transmission/DL reception of a channel/RS is associated with a non-serving cell). In this case, there are advantages that complexity of the UE is reduced and that the UE need not receive a DL signal from the "non-serving cell."

(A2) The "serving cell" is not updated when the UE performs UL transmission/DL reception of a channel/ RS on a non-serving cell (in other words, when a QCL source RS of UL transmission/DL reception of a channel/RS is associated with a non-serving cell). In this case, there are advantages that an influence on a specification is small, operation of Rel. 15 can be maintained, and an influence on UE implementation is small.

Case B (B1) Configurations of a serving cell and a non-serving cell may be approximately the same (completely the same). This has advantages that RRC overhead is low and the UE has one RRC parameter (ServingCellConfig) of the cell configuration (common to a serving cell and a non-serving cell), and hence complexity of the UE is low.

(B2) Different sets of cell configurations may be permitted for a serving cell and a non-serving cell. The UE may be configured differently in terms of at least part of RRC parameters (ServingCellConfig). In this case, there are advantages that flexible network (NW) operation is possible and that performance is improved.

UE Capability

Each of the above embodiments/aspects may be applied only to a case where at least one of corresponding UE capability (UE capability information) being reported (transmitted) and a corresponding parameter being configured by a higher layer is performed. The UE may report at least one of (1) to (7) below as UE capability, and a configuration according to the report may be made.

(1) Whether the UE supports the function of L1/L2 inter-cell mobility.

(2) The number of TCI states corresponding to a non-serving cell(s) for each Component Carrier (CC) configurable by RRC (or all the CCs or all the CCs of each band) (or the total number of TCI states corresponding to a serving cell and TCI states corresponding to a non-serving cell(s)) in L1/L2 inter-cell mobility. Note that the number of TCIs configured by RRC may be related to memory capability of the UE.

(3) The number of TCI states corresponding to a non-serving cell(s) for each CC possible to be activated by a MAC CE (or all the CCs or all the CCs of each band) (or the total number of TCI states corresponding to a serving cell and TCI states corresponding to a non-serving cell(s)) in L1/L2 inter-cell mobility. Note that the number of TCIs possible to be activated may be related to processing capability of the UE.

(4) The number of non-serving cells for each CC possible to be supported by the UE (or all the CCs or all the CCs of each band) (number of different PCIs) in L1/L2 inter-cell mobility. This is alternatively the number of C-RNTIs possible to be supported by the UE in L1/L2 inter-cell mobility.

(5) Whether to support update/change of the "serving cell" in L1/L2 inter-cell mobility (corresponding to the fifth embodiment).

(6) Whether to support different RRC parameters (at least part of ServingCellConfig) in a serving cell and non-serving cells.

(7) Whether dynamic change of a serving cell in the DCI level is supported. If dynamic change of a serving cell in the DCI level is not supported, the UE may support only dynamic change of a serving cell in the MAC CE level (later than DCI). Here, change of a serving cell means change of serving cell assumption (for example, Aspect 5-2) or only change of an QCL source RS related to a serving cell (as in Aspect 5-1).

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 17:
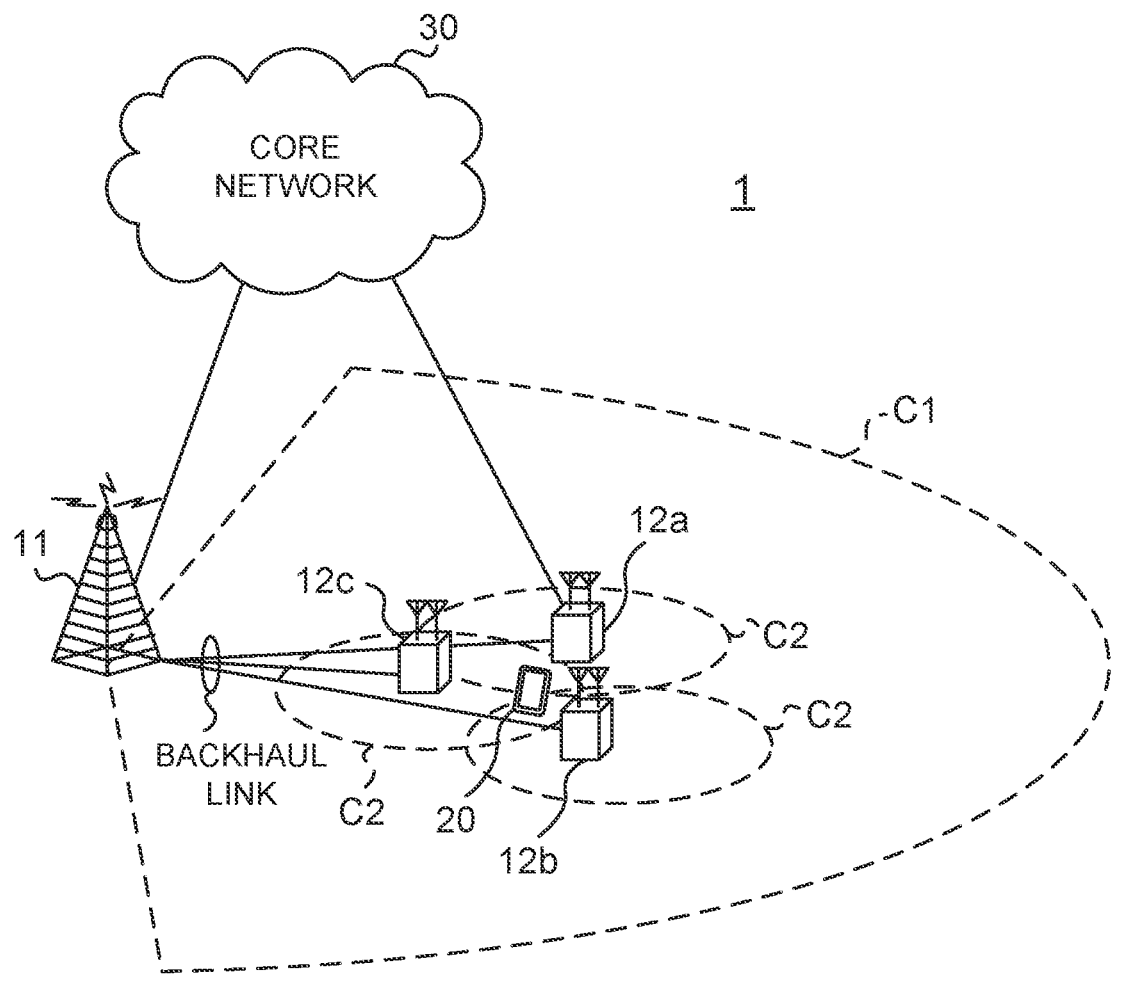
FIG. 17 is a diagram to show an example of a schematic structure of a radio communication system according to one embodiment.

FIG. 17 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (SGCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

Base Station

Figure 18:
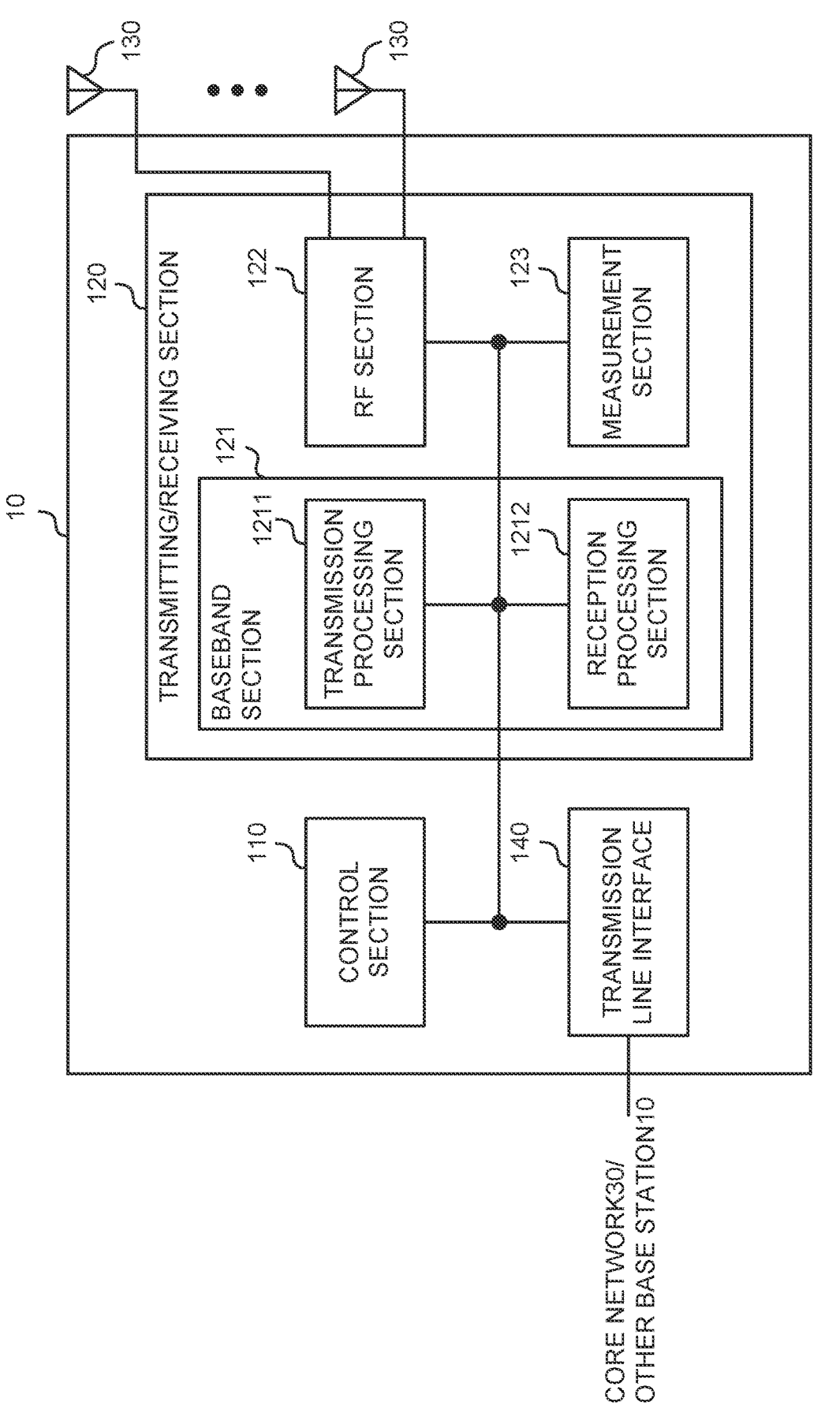
FIG. 18 is a diagram to show an example of a structure of a base station according to one embodiment.

FIG. 18 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit an indication related to a beam. The transmitting/receiving section 120 may receive, when a serving cell is updated by the indication, an uplink signal using one cell radio network temporary identifier (C-RNTI) selected based on the indication from among a plurality of C-RNTIs.

The transmitting/receiving section 120 may receive capability information indicating support of update of at least part of radio resource control (RRC) parameters between a serving cell and a non-serving cell.

The control section 110 may assume, when the capability information is transmitted, different cell radio network identifiers (C-RNTIs) in the serving cell and the non-serving cell.

User Terminal

Figure 19:
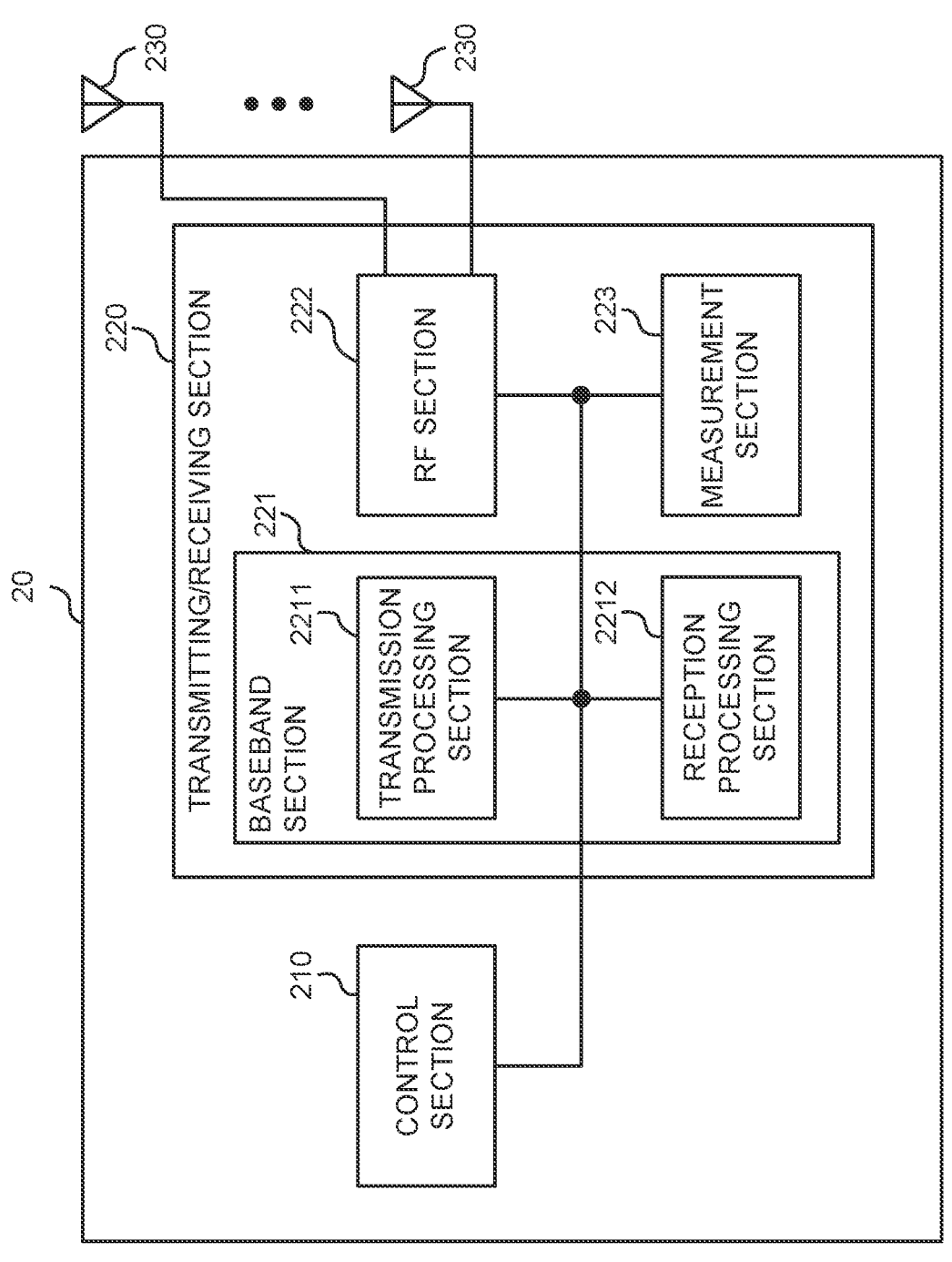
FIG. 19 is a diagram to show an example of a structure of a user terminal according to one embodiment.

FIG. 19 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive an indication related to a beam.

The control section 210 may select, when a serving cell is updated by the indication related to the beam, one cell radio network temporary identifier (C-RNTI) from among a plurality of C-RNTIs, based on the indication. The control section 210 the control section may select the one C-RNTI, based on a transmission configuration indication state (TCI state) corresponding to the serving cell thus updated or a unified TCI state.

The control section 210 may select the one C-RNTI to be used for scrambling of a physical downlink shared channel or a physical uplink shared channel, based on information corresponding to downlink control information for scheduling the physical downlink shared channel or the physical uplink shared channel.

The transmitting/receiving section 220 may transmit capability information indicating support of update of at least part of radio resource control (RRC) parameters between a serving cell and a non-serving cell.

The control section 210 may assume, when the capability information is transmitted, different cell radio network identifiers (C-RNTIs) in the serving cell and the non-serving cell.

When an indication related to a non-serving cell associated with a quasi-co-location source reference signal (QCL source RS) of a transmission configuration indication state (TCI state) is received, the control section 210 may judge that the serving cell is not updated (or is updated) to the non-serving cell.

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 20:
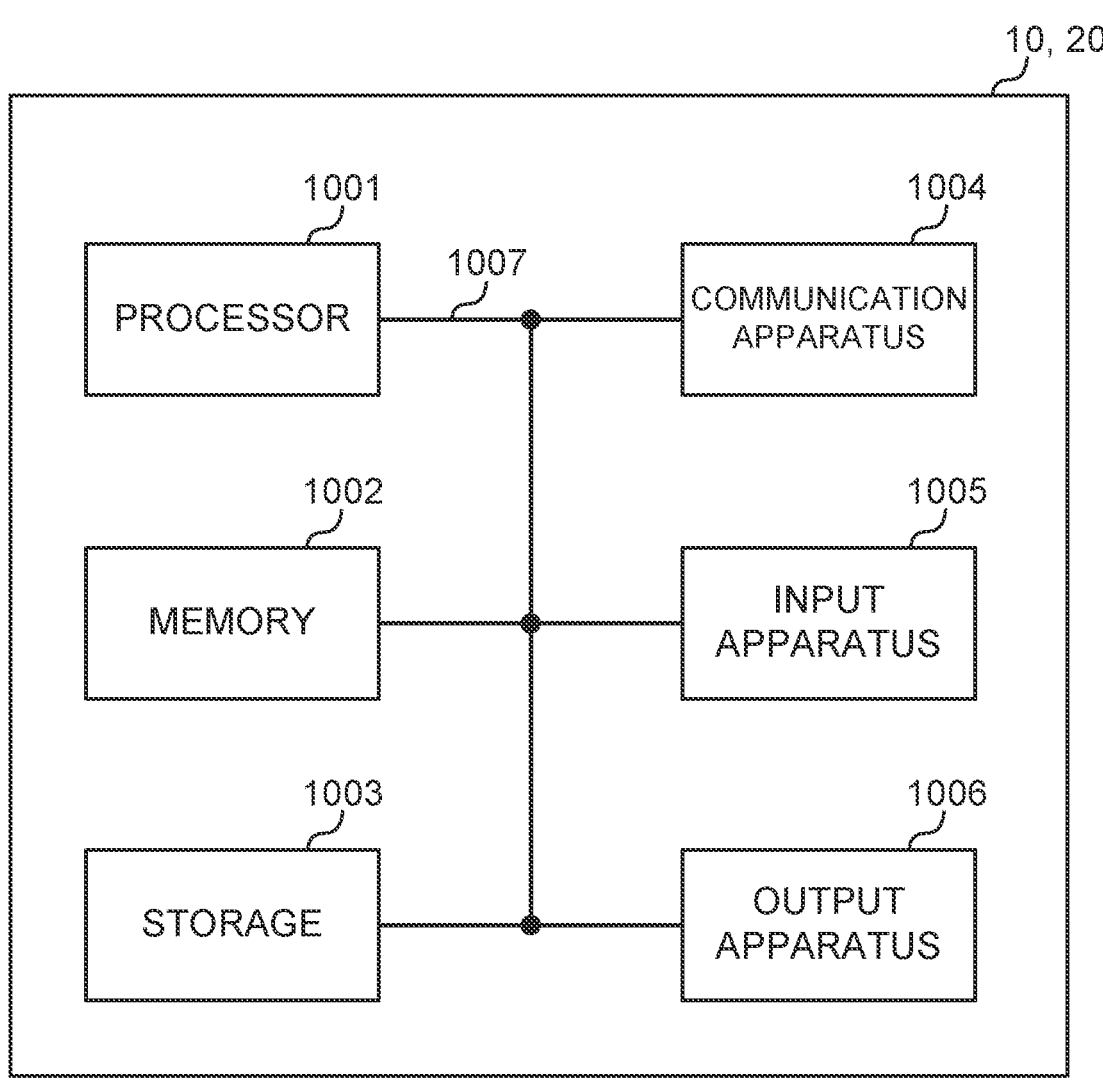
FIG. 20 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 20 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel, and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
  a transmitter that, when switching between a serving cell and a non-serving cell is performed, transmits, to a base station, capability information indicating support of update of at least part of radio resource control (RRC) parameters; and a processor that, when the capability information is transmitted, selects, for the non-serving cell, a cell radio network temporary identifier (C-RNTI) which is different from a C-RNTI of the serving cell, wherein in response to receiving an indication related to a non-serving cell associated with a quasi-co-location source reference signal (QCL source RS) of a transmission configuration indication state (TCI state), the processor determines that the serving cell is updated to the non-serving cell.

2. The terminal according to claim 1, wherein different configurations are applied to the serving cell and the non-serving cell.

3. The terminal according to claim 1, wherein the transmitter transmits capability information indicating a number of TCI states corresponding to a non-serving cell per band, the number of TCI states being capable of being configured by RRC.

4. The terminal according to claim 1, wherein the transmitter transmits capability information indicating a number of TCI states corresponding to a non-serving cell per band, the number of TCI states being capable of being activated by a medium access control control element (MAC CE).

5. A radio communication method for a terminal, comprising:

when switching between a serving cell and a non-serving cell is performed, transmitting, to a base station, capability information indicating support of update of at least part of radio resource control (RRC) parameters;

when the capability information is transmitted, selecting, for the non-serving cell, a cell radio network temporary identifier (C-RNTI) which is different from a C-RNTI of the serving cell; and in response to receiving an indication related to a non-serving cell associated with a quasi-co-location source reference signal (QCL source RS) of a transmission configuration indication state (TCI state), determining that the serving cell is updated to the non-serving cell.

6. A base station comprising:

a receiver that, when switching between a serving cell and a non-serving cell is performed, receives, from a terminal, capability information indicating support of update of at least part of radio resource control (RRC) parameters; and a processor that, when the capability information is received, selects, for the non-serving cell, a cell radio network temporary identifier (C-RNTI) which is different from a C-RNTI of the serving cell, wherein in response to transmitting an indication related to a non-serving cell associated with a quasi-co-location source reference signal (QCL source RS) of a transmission configuration indication state (TCI state), the serving cell is updated to the non-serving cell.

7. A system comprising a terminal and a base station, wherein the terminal comprises:

a transmitter that, when switching between a serving cell and a non-serving cell is performed, transmits, to the base station, capability information indicating support of update of at least part of radio resource control (RRC) parameters; and a processor that, when the capability information is transmitted, selects, for the non-serving cell, a cell radio network temporary identifier (C-RNTI) which is different from a C-RNTI of the serving cell, wherein in response to receiving an indication related to a non-serving cell associated with a quasi-co-location source reference signal (QCL source RS) of a transmission configuration indication state (TCI state), the processor determines that the serving cell is updated to the non-serving cell, and the base station comprises:

a receiver that receives the capability information from the terminal.

* * * * *